United States Patent [19]

Samida

[11] Patent Number: 4,758,293
[45] Date of Patent: Jul. 19, 1988

[54] ULTRASONIC BONDING APPARATUS AND METHOD

[75] Inventor: Jeffrey J. Samida, Neenah, Wis. County, Wis.

[73] Assignee: Kimberly-Clark Corporation, Neenah, Wis.

[21] Appl. No.: 878,143

[22] Filed: Jun. 25, 1986

[51] Int. Cl.[4] .............................................. B29C 65/08
[52] U.S. Cl. .................................. 156/73.1; 156/308.4; 156/553; 156/568; 156/580.1; 493/193; 493/208
[58] Field of Search .................... 156/73.1, 73.3, 308.4, 156/553, 567, 568, 580.1, 580.2; 493/193, 208

[56] References Cited

U.S. PATENT DOCUMENTS

| | | | |
|---|---|---|---|
| 3,837,977 | 9/1974 | Rust | 156/580 |
| 3,844,869 | 10/1974 | Rust | 156/358 |
| 4,047,992 | 9/1977 | Williams et al. | 156/580.1 |
| 4,159,220 | 6/1979 | Bosche et al. | 156/73.1 |
| 4,193,833 | 3/1980 | Young | 156/358 |
| 4,305,240 | 12/1981 | Grevich et al. | 493/208 |
| 4,332,578 | 6/1982 | Van der Meulen | 493/208 |
| 4,414,045 | 11/1983 | Wang et al. | 156/73.2 |
| 4,490,199 | 12/1984 | Dunning | 156/73.4 |
| 4,614,078 | 9/1986 | Kawabe | 493/208 |
| 4,650,530 | 3/1987 | Mahoney et al. | 156/73.1 |
| 4,713,132 | 12/1987 | Abel et al. | 156/553 |

FOREIGN PATENT DOCUMENTS 1632007 8/1970 Fed. Rep. of Germany .
785051 12/1980 U.S.S.R. .............................. 156/73.1

Primary Examiner—Michael Wityshyn
Attorney, Agent, or Firm—Douglas L. Miller

[57] ABSTRACT

Apparatus and method for ultrasonically bonding a web utilizes ultrasonic bonders having respective anvil and sonotrode components which are synchronously orbited with each other and with the rotation of a rotatable drum which carries the web of material to be bonded. One of the anvil and sonotrode components is orbited exteriorly of the drum and the other interiorly of the drum and they are brought into facing alignment through openings in the drum to clamp segments of the material therebetween during passage through a bonding segment of the travel path of the web about the drum. The bonder component orbiting exteriorly of the drum is axially translated away from the anvil along the drum in order to provide clearance for withdrawal of the bonded material from the drum. In this manner, an ultrasonic bonder may clamp the material at a single location for a large segment of its travel along the rotation path of the drum, thereby attaining a bonding time not limited entirely by the travel speed of the web.

23 Claims, 2 Drawing Sheets

ULTRASONIC BONDING APPARATUS AND METHOD

BACKGROUND OF THE INVENTION

1. Field of the Invention

This invention generally relates to an apparatus and method for ultrasonically bonding a web, and more specifically relates to an improved apparatus and method wherein ultrasonic bonding dwell time on a moving material is not limited by the speed of the moving material relative to a stationary bonding station.

2. Description of Related Art

U.S. Pat. No. 4,193,833 to J. L. Young discloses the sealing of thermoplastic-coated paperboard cartons in which the carton layers are engaged on opposite surfaces by, respectively, a vibrating horn and an anvil, for a time sufficient to activate the thermoplastic sealant material. The anvil is movable with respect to the horn, between an inactive position (retracted), and an active position (engaged) in which the opposed work surfaces of the horn and anvil engage the carton layers in a clamping relationship while the horn is energized.

Federal Republic of Germany Offenlegungsschrift No. 1,632,007 of W. Pechmann, published Aug. 20, 1970, discloses a device comprising a plurality of ultrasonic horns and corresponding anvils mounted about the periphery of a rotating head member. During rotation of the head member, a paired anvil/horn unit applies a clamping pressure on a discrete thermoplastic workpiece for a particular period of time and then retracts the horn and anvil for release of the bonded workpiece at another location.

U.S. Pat. No. 4,490,199 to F. G. Dunning discloses an apparatus and method for splicing polymeric webs supported on an anvil, wherein an ultrasonic spot welder is slidably connected to support bars by bearing assemblies and is translated by a driving screw in a direction transverse of the web (column 5, line 68 to column 6, line 4) or axially of the web (column 4, line 66 to column 5, line 1). The welding horn is extended toward the web by a retraction cylinder assembly.

Generally, ultrasonic bonding systems are known in which a sonotrode and its anvil are respectively reciprocated or rotated to meet on opposite sides of a moving continuous web to momentarily clamp the moving web between their respective bonding surfaces to ultrasonically bond it. It is known to mount a plurality of sonotrodes and cooperating anvils along the peripheries of respective counter-rotating drums positioned to form between the bonding surfaces thereof a nip through which one or more plies of moving web are passed. As the drums rotate, portions of the web or webs are clamped between the respective paired bonding surfaces as they pass through the nip in opposed, facing alignment with each other, on opposite sides of the web. With this arrangement, the dwell time of the paired bonding surfaces in bonding-effective alignment with each other is necessarily limited by the speed of travel of the web, which determines the peripheral linear speed of the drums.

SUMMARY OF THE INVENTION

In accordance with the present invention there is provided an apparatus for ultrasonically bonding a material, the apparatus comprising: at least one ultrasonic bonder comprising an anvil and a sonotrode each having a bonding surface; ultrasonic bonder transport means to continuously synchronously move the anvil and the sonotrode along respective closed travel paths which (1) are congruent to each other for a bonding zone segment thereof whereby the respective bonding surfaces of the anvil and the sonotrode are positioned in material-clamping facing alignment with each other during their movement along the bonding zone segment, and (2) which diverge from each other sufficiently to permit withdrawal of the (bonded) material, e.g., of a continuous web of material from between the travel paths; material transport means for introducing an ultrasonically bondable material into the bonding zone segment of the travel path for clamping thereof between the aligned bonding surfaces and for moving the clamped material through the bonding zone segment synchronously with the anvil and sonotrode; and means for energizing the sonotrode to emit ultrasonic vibrations while the anvil and sonotrode bonding surfaces are clamping the material therebetween to effectuate bonding of the material.

In one aspect of the invention, the ultrasonic bonder transport means is configured so that one of the closed travel paths is an inner closed travel path and the other closed travel path is an outer closed travel path which encircles at least the bonding zone segment of the inner closed travel path.

In another aspect, the bonder transport means is configured so that the planar projections of the closed travel paths are substantially concentric. In another aspect, the planar projection of at least one of the closed travel paths may be an oval. The term "planar projection" is defined hereinbelow.

In yet another aspect of the invention, the bonder transport means is configured to axially translate the outer closed travel path relative to the inner closed travel path outside the bonding zone segment in order to provide sufficient clearance between the inner and outer travel paths for withdrawal of the material, e.g., a continuous web of the material, from therebetween.

In another aspect of the invention there is provided apparatus for ultrasonically bonding a material, comprising: (a) a rotatable drum having an outer cylindrical surface; (b) means for rotating the drum; (c) means for introducing the material onto the outer cylindrical surface at a first position and for removing the material from the outer cylindrical surface at a second position circumferentially spaced from the first position, the outer cylindrical surface defining a travel path for the material from the first to the second positions; (d) at least one ultrasonic bonder comprising an anvil and a sonotrode each having a bonding surface; (e) ultrasonic bonder transport means to (1) orbit one of the anvil and sonotrode exteriorly of and synchronously with the drum and to orbit the other of the anvil and sonotrode interiorly of and synchronously with the drum so as to place their respective bonding surfaces into material-clamping facing alignment with each other at the outer cylindrical surface of the drum for at least a bonding zone segment of the travel path, and to (2) axially translate the exteriorly orbiting bonder means away from the drum outer surface to provide clearance for removing the material from the outer cylindrical surface; and (f) means for energizing the sonotrode to emit ultrasonic vibrations while the anvil and sonotrode bonding surfaces are in the material-clamping facing alignment with the material clamped therebetween.

Specific aspects of the invention include one or more of the following: a plurality of ultrasonic bonders are disposed about the outer surface of the rotatable drum, the ultrasonic bonders are equally angularly spaced about the outer cylindrical surface of the drum, the travel path subtends an arc of from about 90° to about 300°, the bonding zone segment of the travel path subtends an arc of from about 30° to about 200°, the sonotrodes orbit interiorly of the drum and the anvils orbit exteriorly of the drum, and the anvils orbit interiorly of the drum and the sonotrodes orbit exteriorly of the drum.

In accordance with the method aspect of the present invention there is provided a method for ultrasonically bonding a material by means of at least one ultrasonic bonder comprising an anvil component and a sonotrode component, each having a bonding surface, the method comprising: continuously synchronously moving the anvil and the sonotrode components along respective closed travel paths which are congruent to each other for a bonding zone segment thereof and maintaining the respective bonding surfaces of the anvil and the sonotrode in material-clamping, facing alignment with each other during their travel through said bonding zone segment; introducing an ultrasonically bondable material, e.g., a continuous web of material, into the bonding zone segment of the travel path, clamping the material between the aligned bonding surfaces and moving the clamped material through the bonding zone segment synchronously with the anvil and sonotrode; energizing the sonotrode in the bonding zone segment to emit ultrasonic vibrations while the anvil and sonotrode bonding surfaces are clamping the material therebetween in order to effectuate bonding of the material; and moving the anvil and the sonotrode components along respective diverging segments of their closed travel paths outside the bonding zone segments thereof, which diverging segments diverge sufficiently to permit withdrawal of the resultant bonded material from between the travel paths.

Other method aspects of the invention include method aspects corresponding to the above-described apparatus aspects, e.g., moving the ultrasonic bonding components about outer and inner closed travel paths which may be concentric, etc.

As used herein and in the claims, the term "sonotrode" will be understood to mean an ultrasonic bonding device to which energy may be applied to generate ultrasonic vibrations transmittable to an ultrasonically bondable material clamped between a bonding surface of the sonotrode and a bonding surface of a suitable anvil therefor. The sonotrode and the anvil thus comprise respective components of an ultrasonic bonding means, sometimes herein and in the claims referred to as an ultrasonic bonder.

Other aspects of the invention are set forth in the following detailed description of preferred embodiments.

DETAILED DESCRIPTION OF THE PREFERRED EMBODIMENTS

The present invention employs ultrasonic bonding means, i.e., one or more ultrasonic bonders, each comprising an anvil component and a sonotrode component and having a bonding surface. In a preferred embodiment, one of the anvil and sonotrode ultrasonic bonding means is synchronously orbited interiorly of a drum or the like and radially positioned to present its bonding surface at or adjacent the outer cylindrical surface of the drum (e.g., through an opening therein) during rotation thereof along a bonding zone segment of the travel path of the drum. The other ultrasonic bonding means is synchronously orbited exteriorly of the drum to present its bonding surface in opposed facing aligned relationship to the bonding surface of the interiorly orbiting component of the bonding means in the bonding zone segment of the travel path, and is axially translated away from the drum outer surface outside the bonding zone segment of the travel path in order to allow clearance between the respective travel paths of the bonder components for withdrawal from therebetween of the material being bonded. The latter may comprise a continuous travelling web. The travel path in this embodiment is the circumferentially extending path on the outer cylindrical surface of the rotatable drum, between the point of introduction of the web onto the outer cylindrical drum surface and the point circumferentially spaced therefrom for removal of the web from the outer cylindrical drum surface.

Generally, any suitable ultrasonically bondable material may be used in the practice of the present invention. Such materials may be fibrous or non-fibrous in character and, when provided as a fibrous web, the same may be woven or non-woven and may be in any suitable sheet form, e.g., travelling continuous webs, which is capable of being introduced into and withdrawn from a bonding zone as described below. For example, the bonding zone may be defined by an outer cylindrical surface of a rotating drum. By way of example, thermoplastic materials, including polyolefins such as polyethylene and polypropylene, polyesters, polyamides, and copolymers of one or more of the foregoing as well as blends and mixtures thereof are useful in the practice of the invention. Ultrasonically bondable materials may be optionally combined with other materials which are not ultrasonically bondable to form a composite material which is useable in the invention so long as the ultrasonic bondability of such composite material is retained. The sheet or web may be single-ply, as where ultrasonic bonding of the web is utilized to reinforce portions of the web, such as for bonding an extended area of the web which then is intermediately severed to provide reinforced edges of the respective severed articles. Alternatively, two or more sheets or webs comprising two or more layers of superposed material may be bonded together in the practice of the invention.

Figure 1:
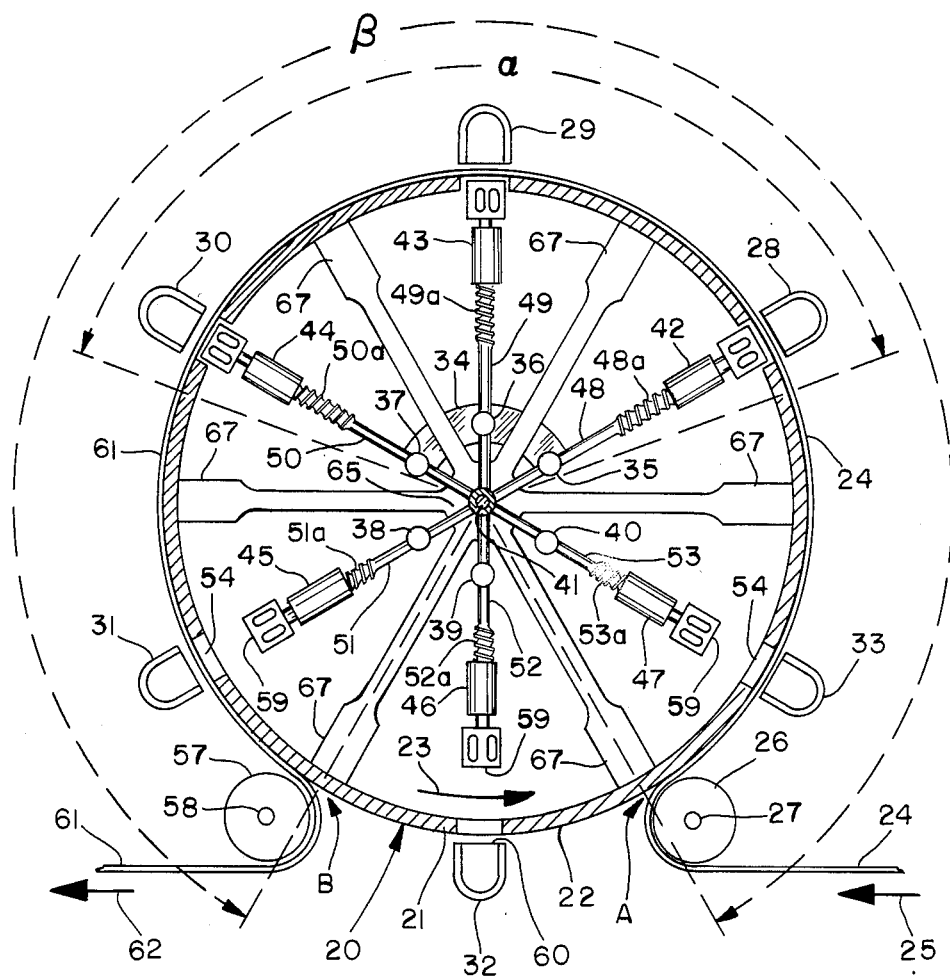
FIG. 1 is a schematic, side elevation view with parts broken away of the drum side of an apparatus for ultrasonically bonding a web, according to one embodiment of the present invention.

Referring to FIG. 1, a rotatable drum 20 having a drum wall 21 with an outer cylindrical surface 22 is driven in the direction indicated by arrow 23 by drive means (FIG. 2) comprised of drive motor 10 coupled to drive shaft 41 to rotate it and thereby rotatable drum 20. A continuous travelling web 24 of material to be ultrasonically bonded is introduced to the apparatus in the direction shown by arrow 25 for passage onto a rotating feed roll 26 mounted on a shaft 27, from which the web 24 is introduced onto the outer cylindrical surface 22 of the rotatable drum 20 at a first position A and subsequently is removed from the outer cylindrical surface 22 at a second position B circumferentially spaced from the first position A. Cylindrical surface 22 between points A and B thereof in the direction of drum travel defines a travel path for the web 24, the ultrasonically bonded product web 61 being removed from rotatable drum 20 at position B, by means of rotatable take-off roll 57 mounted on shaft 58, and discharged from the apparatus in the direction shown by arrow 62. The travel path of the web along drum 20 thus defines an arc subtending on angle beta which may be on the order of from about 90° to about 330°, and more preferably from about 120° to about 300°.

Figure 2:
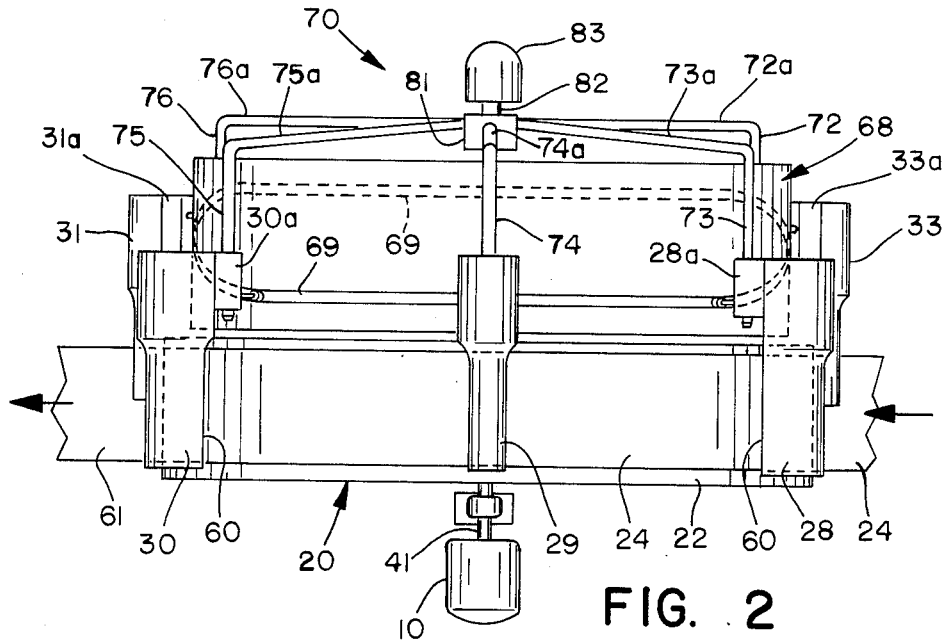
FIG. 2 is a top plan view of the apparatus of FIG. 1.
Figure 3:
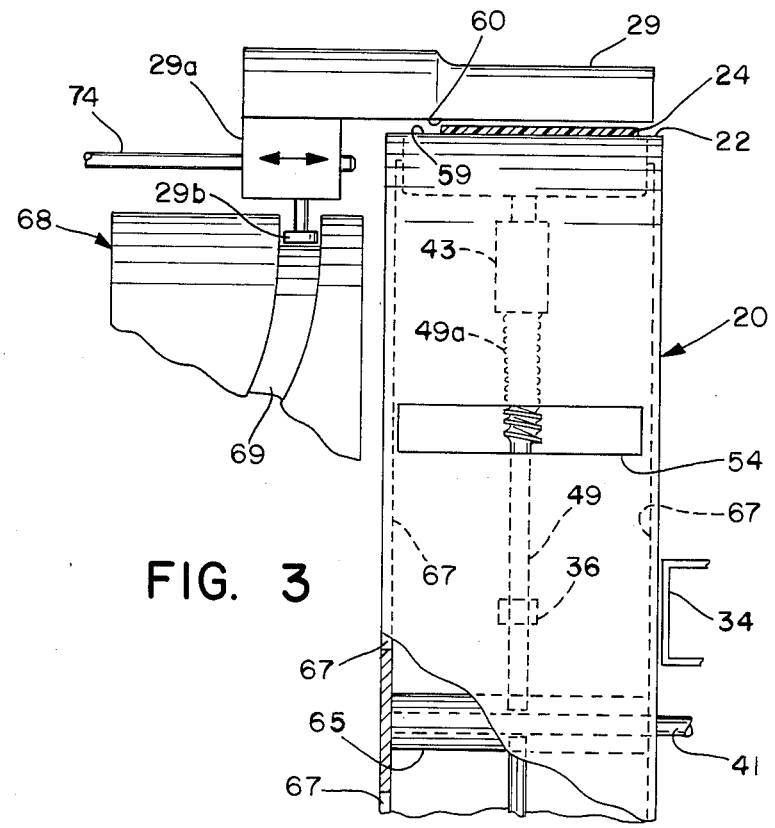
FIG. 3 is a partial end elevation view on an enlarged scale of the apparatus of FIG. 1.

Disposed outwardly of and equally spaced-apart along the periphery of the drum 20 are anvils 28, 29, 30, 31, 32 and 33. Disposed inwardly of and equally spaced-apart along the periphery of the drum 20 are sonotrodes 42, 43, 44, 45, 46 and 47, respective ones of which are aligned with the respective ones of the anvils along radii of the drum 20, each paired anvil and sonotrode comprising a component of an ultrasonic bonder. Each of the sonotrodes 42-47 has at its outer extremity a bonding surface 59 and each of the anvils 28-33 has at its outer extremity a bonding surface 60. At each of the circumferentially spaced-apart locations at which respective anvils are radially aligned with their associated sonotrodes, there is provided a wall opening 54 (FIG. 3) in the wall 21 of drum 20. (Only one such opening is shown in FIG. 3, for clarity of illustration.) Each of the sonotrodes is mounted for reciprocating movement, respectively, on mounting shafts 48, 49, 50, 51, 52 and 53. The radially inner end of each of the shafts is fixed by suitable means (not shown) to the drive shaft 41, such as by being received within a hub collar 65 (FIG. 3) of a radial arm support comprised of hub collar 65, which is fixedly mounted upon shaft 41 for rotation therewith and two sets of radially extending arms 67 (FIGS. 1 and 3) at each end of hub collar 65. The radial arm support mounts rotatable drum 20 upon shaft 41 for rotation therewith. Drive shaft 41 is thus driven by the drive motor 10 (FIG. 2) for rotation of the rotatable drum 20 and the sonotrodes 42-47 in synchrony therewith. Reciprocating movement of sonotrodes 42-47 or their respective mounting shafts 48-53 may be attained by any suitable means, such as by use of cam followers and slidably mounted or telescoping support shafts, the cam followers engaging eccentric cam tracks to impart a non-circular orbiting path to the sonotrodes so that they reciprocate radially during each orbit. Another expedient, illustrated in the drawings, is to mount the sonotrodes 42-47 for sliding movement along their respective shafts 48-53 and to provide a worm gear drive driven by a small electric motor to slide the sonotrode along its respective mounting shaft and thereby radially reciprocate the sonotrode relative to the drum outer surface 22. Such motorized worm gear drives are schematically shown as drives 48a, 49a, 50a, 51a, 52a and 53a mounted, respectively, on the correspondingly numbered shafts.

A switch plate 34 (FIGS. 1 and 3) is provided in the form of an arcuate stationary plate mounted adjacent to rotatable drum 20 and defining an arc subtending an angle alpha (FIG. 1) which may be on the order of from about 30° to about 200°, and more preferably is from about 45° to about 180°. Each of the mounting shafts 48, 49, 50, 51, 52 and 53 is provided with a respective sensing switch 35, 36, 37, 38, 39 and 40, mounted thereon.

The sensing switches may comprise electric eye devices or other electrical or electronic devices which sense the location of switch plate 34 or indicia or apertures or other trigger means thereon. During rotation of the shaft-mounted sonotrodes 42-47 with rotatable drum 20, the passage of a particular one of shafts 48-53 into the arc subtended by switch plate 34 causes the sensing switch 35-40 associated with such shaft to be actuated by the switch plate or trigger means or the like thereon, to activate the associated one of worm gear drives 48a-53a to radially slide the associated sonotrode along the shaft on which it is mounted between a radially retracted and a radially extended position. In the radially retracted position the bonding surface of the sonotrode is radially inwardly spaced from the outer cylindrical surface 22 of the rotatable drum 20, as is shown for sonotrodes 45, 46 and 47 in FIG. 1. In the radially extended position, the bonding surface of the sonotrode is presented via wall openings 54 in drum 20 (FIGS. 1 and 3) at the outer cylindrical surface 22 thereof as shown for sonotrodes 42, 43 and 44 in FIG. 1. As drum 20 continues its rotation and sonotrodes 45, 46 and 47 orbit along the travel path subtended by switch plate 34, the end thereof is sensed by the associated one of switches 35-40 and the switch activates its associated worm gear drive to radially retract the associated sonotrode for the balance of its orbital path. Periodic radial translation of the sonotrode along its associated shaft is thus carried out by the worm gears during each revolution of drum 20. The anvils 28, 29, 30, 31 and 33 are mounted upon a spider carousel 70 (FIG. 2) comprising a plurality of carrier rods, of which rods 72, 73, 74, 75 and 76 are visible in FIG. 2. Each carrier rod is joined to a respective one of spokes 72a-76a which is received within a hub 81 which is coupled via a drive shaft 82 to a carousel drive motor 83, whereby the spider carousel 70 may be rotated for orbiting of the anvils exteriorly of drum 20, about the periphery thereof. Drive motors 83 and 10 are synchronized so that sonotrodes 42-47 and anvils 28-33 orbit in unison, i.e., synchronously, with each other and with rotation of drum 20. In an alternative embodiment, both the drum 20 and the spider carousel 70 could be driven by a single motor. For example, the drive motor 83 joined to shaft 82 could, by extension of the shaft 82, be connected to rotatable drum 20 to drive it in place of drive shaft 41 and drive motor 10.

Positioned adjacent the rotatable drum 20 is a stationary cam block 68 (FIGS. 2 and 3) having a cylindrical shape and outer surface roughly comparable to outer surface 22 of drum 20. Cam block 68 is provided on its outer cylindrical surface with a cam track 69 having helical turns in it, visible in FIG. 2 at the opposite ends of cam block 68. Each of the anvils 28, 29, 30, 31, 32 and 33 are mounted on respective ones of a series of mounting blocks. Only mounting blocks 28a, 30a, 31a and 33a associated with, respectively, anvils 28, 30, 31 and 33 are visible in FIG. 2 and only mounting block 29a associated with anvil 29 is shown in FIG. 3. Each of the mounting blocks is mounted for sliding reciprocating movement on an associated carrier rod 72-76 and has thereon a cam follower, a typical one of which, cam follower 29b, is visible in FIG. 3 and is the only cam follower shown in the drawings. Each cam follower is engaged with cam track 69 of cam block 68, described below. The respective mounting blocks are suitably provided with internal mounting means including stop means to provide for low friction reciprocal sliding movement of the mounting blocks between set limits along the associated carrier rods 72-76. During orbiting, the anvils reciprocate on the carrier rods because the cam followers (e.g., cam follower 29b, FIG. 3) are constrained to follow the path of cam track 69.

In the illustrated embodiment, the sonotrodes 42-47 are positioned interiorly of the rotatable drum and are radially outwardly extended to present their respective bonding surface 59 at the outer cylindrical surface 22 of the drum via an opening 54 during orbiting of the sonotrodes along the bonding zone segment (subtended by the angle alpha) of its travel path. The cooperating anvils 28-33 are positioned to orbit exteriorly of the rotatable drum 20 whereby during the bonding zone portion of the travel path about the periphery of rotatable drum 20, successive sonotrode bonding surfaces 59 are brought into facing alignment with the corresponding anvil bonding surfaces 60 to clamp the travelling web material 24 therebetween. When the respective bonding surfaces of an anvil and corresponding sonotrode are brought into such facing alignment with one another on either side of the web 24, actuator means energize the sonotrode to emit ultrasonic vibrations for ultrasonic bonding of the web. The actuator means may suitably comprise the aforementioned switches 35-40, which can serve not only to actuate extension and retraction of the sonotrodes, but energization thereof. Thus, when the sonotrode bonding surfaces 59 are brought into engaged position within the bonding zone the sonotrodes are energized.

In the illustrated apparatus, the bonding surfaces of those anvils (28, 29 and 30) within the bonding zone are in contacting relationship with the outer surface of the web 24 to be bonded. Conversely, those anvils (31 and 33) outside of the bonding zone are in axially spaced relationship to the surface of the rotatable drum and therefore to the web 24, as shown in FIG. 2, in which the orbital path travel including axial translation of the anvil means 28-33 about and exteriorly of rotatable drum 20 is clearly shown. "Axial" as used herein and in the claims refers to a direction along the axis of rotation and orbiting, i.e., the longitudinal axis of shafts 41 and 82. All reference to a planar projection of a travel path herein and in the claims, refers to projection onto a plane which is perpendicular to the axis of rotation/orbiting.

FIG. 3 is simplified for clarity, showing only the uppermost positioned anvil 29 and, in dotted outline, sonotrode 43, the latter being disposed interiorly of drum 20. Only a cross section of web 24 at the top (as viewed in the drawing) is shown, the remainder of web 24 being omitted for clarity of illustration. Anvil 29 is carried by a mounting block 29a which carries the cam follower 29b extending downwardly (as viewed in the drawing) therefrom and, as described above, engaging recessed cam track 69 of the cam block 68. As described above in connection with FIG. 2, mounting block 29a is mounted for reciprocating movement on carrier rod 74, whereby the anvil 29 will be axially translated by reciprocating movement imposed upon it by virtue of cam follower 29b following cam track 69. As shown in FIG. 2, during orbiting of anvils 28-33 through the bonding zone segment of the orbital path, the bonding surfaces 60 (FIG. 1) of the anvils are aligned with openings 54 in drum 20 and bonding surfaces 59 of radially extended sonotrodes 42-44. Outside the bonding zone segment, cam track 69 curves away from drum 20 and follows a path (dotted line portion in FIG. 2) which is axially further from drum 20 than the bonding zone segment of cam track 69, whereby anvils 28-33 are axially translated away from drum 20 by sliding movement along their associated carrier rods 72-76. For example, in FIG. 2 anvil 31 is moving away from drum 20 so that it will clear the bonded portion 61 of the web being withdrawn from drum 20. Anvil 33 is moving towards drum 20 to get into alignment therewith prior to or at the point of entering the bonding zone segment of the travel path of web 24, but its axially displaced location in FIG. 2 allows room for entry of web 24 onto drum 20. As described above, when anvils 28-33 are in their bonding zone position they are radially positioned to be in engagement with the outer surface of the web 24 and sonotrodes 42-47 are radially extended to be in engagement with the inner (drum-side) surface of web 24, so that the web is clamped therebetween to effect bonding while the sonotrode 43 is energized. Thus, the array of anvils is orbited synchronously with the rotation of the rotatable drum and the orbiting of the array of sonotrodes disposed therein. The sonotrodes are preferably radially extended to effect bonding during the passage of the web along the bonding zone segment of the travel path and radially withdrawn to a retracted position when the portion of the drum associated therewith is outside the bonding zone segment of the travel path. The radial retraction saves wear on the sonotrode bonding surfaces but the invention could be operated with the sonotrode bonding surfaces permanently mounted in the radially extended position. Thus, the planar projection as defined above, i.e., onto a plane perpendicular to the axis of rotation of the closed orbital travel path of sonotrodes 42-47 (and their bonding surfaces), is oval in the illustrated embodiment, but it could be circular. The planar projection of the closed orbital travel path of anvils 28-33 (and their bonding surfaces) is circular and, in the illustrated embodiment, is an outer closed travel path which encircles at least the bonding zone segment of the inner closed travel path defined by the sonotrodes. In the illustrated embodiment, the inner and outer closed travel paths, or at least their projection onto the plane are concentric, but they need not necessarily be. For example, if the inner closed circular path is oval it need not be concentric with the outer closed travel path.

In a preferred embodiment not illustrated, the anvils are disposed outwardly on and equally spaced apart along the periphery of the drum. Positionally outwardly of and equally spaced-apart along the periphery of the drum are sonotrodes. Each sonotrode is mounted for reciprocating movement, on mounting shafts and levers. The levers are slideably mounted on their respective mounting shaft and moved to and away from the anvil area during each orbit of the drum. The reciprocating movement of the sonotrodes and their levers may be attained by any suitable means such as by use of cam followers engaging eccentric cam tracks to impart a nonplanar orbiting path to the sonotrodes so that they reciprocate axially during each orbit. The sonotrodes are brought into contact with the anvil by rotating the lever to move the sonotrodes radially inward and outward for a preselected portion of the nonplanar orbit described above. The period of contact between the sonotrode and anvil is defined broadly by the dimensions of the drum and the rate of rotation. However, more importantly, within the more narrow operating region, the lever may be controlled to maintain contact between the anvil and sonotrodes for a desired period of time irrespective of the rate of rotation or diameter of the drum.

The ultrasonic bonding carried out by the invention may also include cutting. For example, as disclosed in commonly owned copending patent application Ser. No. 800,017 of J. J. Samida and J. I. Van Deurzen entitled, "Apparatus and Method For Contemporaneously Bonding and Severing An Ultrasonically Fusible Material", the entire disclosure of which is incorporated by reference herein, ultrasonic bonders which sever as well as bond may be utilized as the ultrasonic bonders used in the invention. Whether using such ultrasonic bonding-/severing means or not, the continuous web illustrated in describing the illustrated embodiment of the invention may be cut into discrete articles as part of the process, or it may be discharged from the process as a continuous web.

Although the invention has been described in detail with respect to specific embodiments, it will be appreciated that various modifications thereof should be regarded as being within the spirit and scope of the present invention.

What is claimed is:

1. A method for ultrasonically bonding a material with an ultrasonic bonder comprising an anvil and a sonotrode, comprising the steps of:
    continuously, synchronously moving the anvil and the sonotrode along respective closed travel paths that are congruent to each other for a bonding zone segment thereof,
    generally radially reciprocating one of the anvil and the sonotrode relative to its respective closed travel path between an extended position along the bonding zone segment and a retracted position generally radially inside the bonding zone segment,
    linearly translating the other of the anvil and the sonotrode in a generally axial direction relative to its respective closed travel path between an extended position along the bonding zone segment and a retracted position generally axially away from the bonding zone segment,
    aligning the anvil and the sonotrode in material-engaging facing relationship at their extended positions along the bonding zone segment,
    introducing an ultrasonically bondable material into the bonding zone segment,
    engaging the material between the anvil and the sonotrode at their extended positions along the bonding zone segment, and
    energizing the sonotrode at its extended position to ultrasonically bond the material.

2. The method of claim 1 including moving a plurality of said ultrasonic bonders by orbiting them in an array of bonders which are equally spaced-apart along the travel path.

3. The method of claim 1 including introducing a continuous web of ultrasonically bondable material into said bonding zone segment.

4. The method of claim 3 including withdrawal of the resultant bonded material as a continuous web of bonded material.

5. The method of claim 1 including moving one of the anvil and the sonotrode about an outer closed travel path and moving the other of the anvil and the sonotrode about an inner closed travel path, a planar projection of the inner closed travel path being encircled by a planar projection of the outer closed travel path.

6. The method of claim 5 wherein the planar projection of the inner closed travel path is oval.

7. The method of claim 5 wherein the planar projection of the outer closed travel path is circular.

8. The method of claim 5 wherein the planar projection of at least one of said travel paths is oval.

9. The method of claim 5 including moving the anvil about the outer closed travel path and the sonotrode about the inner closed travel path.

10. The method of claim 5 including moving the sonotrode about the outer closed travel path and the anvil about the inner closed travel path.

11. The method of claim 5 including orbiting one of the anvil and the sonotrode traveling on the inner closed travel path about a non-circular orbit.

12. Apparatus for ultrasonically bonding a material, comprising:
    (a) a rotatable drum having an outer cylindrical surface with an opening therein;
    (b) means for rotating said drum;
    (c) means adapted for introducing the material onto the outer cylindrical surface at a first position and for removing the material from the outer cylindrical surface at a second position circumferentially spaced from the first position, the outer cylindrical surface defining a travel path for the material from said first to said second position;
    (d) an ultrasonic bonder comprising an anvil and a sonotrode each having a bonding surface;
    (e) ultrasaonic bonder transport means to (1) orbit one of said anvil and said sonotrode exteriorly of and synchronously with said drum and to orbit the other of said anvil and said sonotrode interiorly of and synchronously with said drum so as to place their respective bonding surface into material-clamping facing alignment with each other at the opening in the outer cylindrical surface of the drum for at least a bonding zone segment of the travel path, and to (2) axially translate, relative to the travel path, the exteriorly orbiting one of said anvil and said sonotrode away from the drum outer surface to provide clearance for removing the material from said outer cylindrical surface; and
    (f) means for energizing the sonotrode to emit ultrasonic vibrations while the anvil and sonotrode bonding surfaces are in said material-clamping facing alignment with the material clamped therebetween.

13. The apparatus of claim 12, wherein said travel path subtends an arc of from about 90° to about 300°.

14. The apparatus of claim 12, wherein said bonding zone segment of said travel path subtends an arc of from about 30° to about 200°.

15. The apparatus of claim 12, including a plurality of ultrasonic bonders disposed about and a like plurality of openings disposed in the outer surface of said rotatable drum, each one of said ultrasonic bonders having its respective bonding surfaces in material-clamping facing alignment with a respective one of said openings.

16. The apparatus of claim 15, wherein said ultrasonic bonders and said openings are equally angularly spaced about said outer cylindrical surface of said drum.

17. The apparatus of claim 15, wherein said sonotrodes orbit interiorly of said drum and said anvils orbit exteriorly of said drum.

18. The apparatus of claim 15, wherein said anvils orbit interiorly of said drum and said sonotrodes orbit exteriorly of said drum.

19. An apparatus for ultrasonically bonding a material, comprising:
   an ultrasonic bonder comprising an anvil and a sonotrode,
   an ultrasonic bonder transport means for continuously synchronously moving said anvil and said sonotrode along respective closed travel paths that are congruent to each other for a bonding zone segment thereof,
   one of said anvil and said sonotrode being generally radially reciprocable relative to its respective said closed travel path between an extended position along said bonding zone segment and a retracted position generally radially inside said bonding zone segment,
   the other of said anvil and said sonotrode being linearly translatable in a generally axial direction relative to its respective said closed travel path between an extended position along said bonding zone segment and a retracted position generally axially away from said bonding zone segment, said anvil and said sonotrode being in material-engaging facing alignment along said bonding zone segment, whereby the material to be bonded is engaged by said anvil and said sonotrode along said bonding zone segment, and
   means for energizing said sonotrode to emit ultrasonic vibrations along said bonding zone segment, whereby the material is bonded.

20. The apparatus of claim 19 further comprising a material transport means adapted for introducing an ultrasonically bondable material into said bonding zone segment for engagement thereof between said anvil and said sonotrode and for moving the engaged material through said bonding zone segment synchronously with said anvil and said sonotrode.

21. The apparatus of claim 19 wherein said ultrasonic bonder transport means is configured so that one of said closed travel paths is an inner closed travel path and the other closed travel path is an outer closed travel path which encircles at least the bonding zone segment of the inner closed travel path.

22. The apparatus of claim 21 wherein said bonder transport means is configured so that respective planar projections of said closed travel paths are substantially concentric.

23. The apparatus of claim 21 or claim 22 wherein a planar projection of at least one of said closed travel paths is an oval.

* * * * *